Patented July 31, 1928.

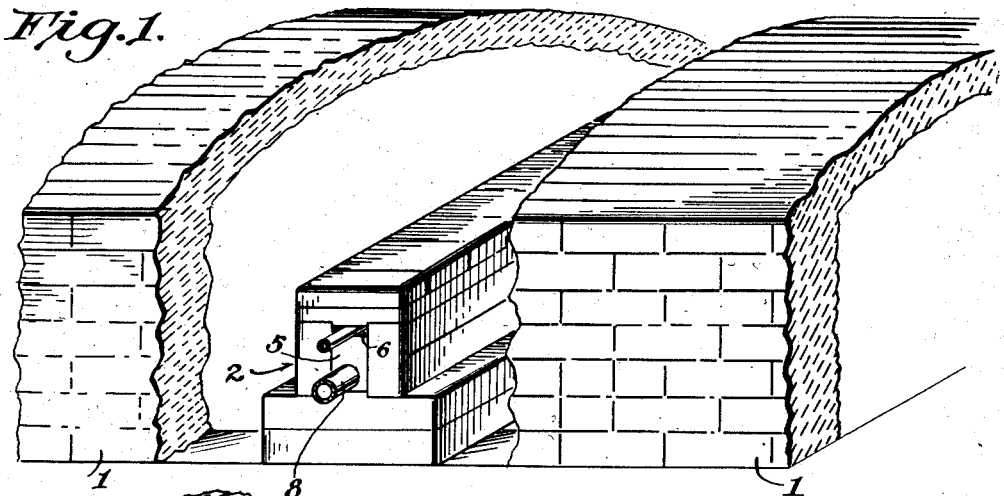
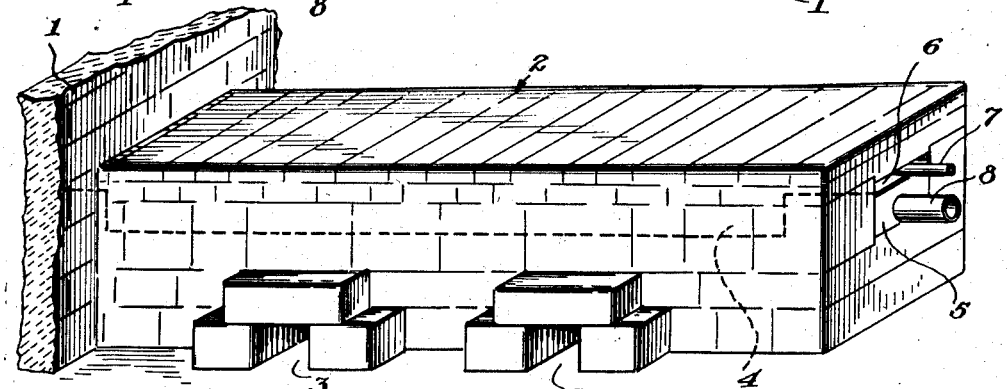
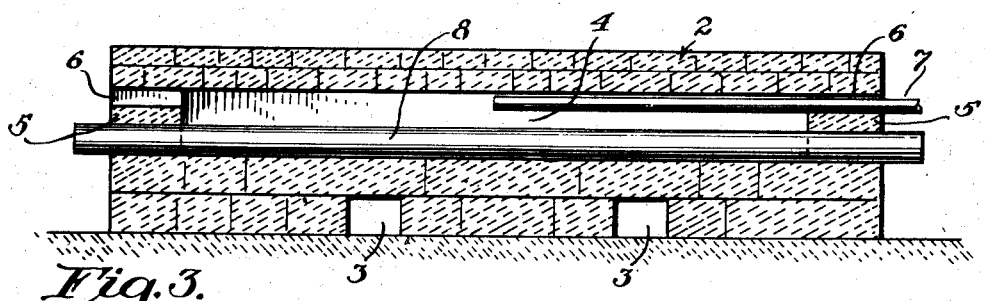

1,679,295

UNITED STATES PATENT OFFICE.

ALFRED W. DODGE, OF ZANESVILLE, OHIO, ASSIGNOR TO HAZEL-ATLAS GLASS CO., OF WHEELING, WEST VIRGINIA, A CORPORATION OF WEST VIRGINIA.

BRIDGE WALL FOR GLASS TANKS.

Application filed January 13, 1927. Serial No. 160,918.

For reasons well known to those skilled in the glass art, the life of the bridge wall, which divides the glass tank or furnace into a melting end and a refining end, is comparatively short. Numerous efforts have been made to cool the bridge wall in various ways, for the purpose of extending the life thereof; but I have devised a bridge wall construction involving cooling means, which possesses numerous advantages over bridge wall constructions previously known, and which materially extends the life of the bridge wall.

One of the novel and highly important features of the invention resides in the provisions of a structure whereby the water used for cooling purposes comes into direct contact with the bottom and side walls of the trough, thereby more effectually cooling the bridge wall and consequently prolonging the life thereof.

Another novel and material feature of the invention resides in the provision of a structure whereby the water used for cooling purposes will come into direct contact with the glass, after the bridge wall is sufficiently worn away, thereby freezing the glass in the immediate vicinity, and thus materially retarding further destructive action of the glass.

Another material feature of the invention resides in the provision of a reinforcing member which extends entirely through the bridge wall, directly over the top of the blocks forming the roof of the throats through which the glass passes; thereby preventing the roof of the throat, or other parts of the bridge wall, from being forced upward by the pressure of the glass.

Other objects and advantages of the invention will be apparent to those skilled in the art, from the following detailed description, when taken in connection with the accompanying drawings; in which, Figure 1 is a perspective view of a conventional glass tank, with parts broken away to show the bridge wall.

Figure 2 is a perspective view of a bridge wall of slightly different shape; and, Figure 3 is a vertical longitudinal sectional view of the bridge wall.

Referring to the drawings more in detail, numeral 1 indicates the wall of a conventional glass tank, provided with a bridge wall 2, which may be of any ordinary shape, examples of which are illustrated in Figure 1 and 2. The purpose of the bridge wall is of course, to separate the refining end of the tank from the melting end thereof; and the usual throats 3 are provided to permit the glass to flow from the melting end to the refining end.

The bridge wall and particularly the walls of the throats are subjected to very severe wear, due mainly to the dissolution of the blocks by the chemical action of the fluxes in the glass batch, and to a less extent by the frictional contact of the moving glass; and in a relatively short time the bridge walls are rendered useless. As stated hereinbefore the purpose of the present invention is to extend the life of bridge walls, and the means by which I have accomplished this will now be described.

The interior of the bridge wall is provided with a hollow space or trough 4, which extends substantially the entire length of the bridge wall, and at the ends of the trough are end walls or dams 5, for the purpose of maintaining the water in the trough at a predetermined level. In the specific construction illustrated the end walls do not extend quite up to the roof of the trough, thereby providing a space or slot 6 for the overflow of water at each end of the bridge wall. Obviously, overflow pipes, or any suitable means, are provided for carrying off the water. For the purpose of supplying water to the trough I provide a pipe 7 which preferably leads to a point midway of the length of the trough. The cooling water flows through the pipe 7 directly into the trough and fills it to a predetermined level, depending on the level of the glass in the tank; and it is to be particularly noted that there is no lining whatever in the trough, so that the water comes into direct contact with the bottom and side walls of the trough.

In operation, the water being in direct contact with the bottom and walls, and being kept in constant circulation, carries off a great deal of the heat imparted to the bridge wall, and by thus lowering the temperature of the bridge wall it is apparent that the life thereof is extended by reducing the chemical action of the fluxes in the glass. In the course of time, however, the refractory blocks forming the bridge wall will gradually dissolve, until finally the roof of the throat will wear entirely through. Even when this happens the period of service of the bridge wall is not at an end, for the cooling water will come directly into contact with the glass, thereby freezing it and retarding further destructive chemical action.

It has been found that by constructing the bridge wall in the manner above described, and supplying water at a point preferably midway of the length of the trough and letting it overflow at both ends, the bridge wall is cooled to the extent of prolonging the period of service, and without any detrimental effect upon the refractory blocks, or upon the quality of the glass passing through the throats of the bridge wall.

In practice the water may be maintained in the trough from the beginning of the melting period, though this is not deemed to be necessary.

The molten glass in the tank exerts an upward pressure on the bottom of the trough. To prevent any possibility of the refractory blocks being forced upward and to maintain the bottom of the trough in alignment throughout its length, I provide a reinforcing member 8 which extends the entire length of the bridge wall, and which is preferably, though not necessarily, in the form of a pipe, as shown. It is to be particularly noted that this reinforcing member 8 is arranged directly above the floor or bottom of the trough 4, and that the ends of the member are anchored in the end walls or dams 5. It is thus apparent that the member 8 will act as a brace for the bottom of the trough in the event that certain parts of the refractory material should tend to rise due to the pressure of the molten glass, and will thus maintain the bottom of the trough in alignment throughout its length.

I have described the simple and efficient structure by which the life of glass tanks may be prolonged, even after the bridge wall has worn away to a point where the glass has, in places, totally eaten away the refractory block; but while I have described the preferred form of the construction, it is apparent that the invention is subject to numerous changes and modifications, all of which I aim to include within the scope of the appended claims.

What I claim is:

1. A bridge wall for glass tanks, having a trough in the interior thereof, the side walls and bottom of said trough formed of the refractory material of the bridge wall, and means for circulating cooling water in said trough in contact with the refractory material.

2. A bridge wall for glass tanks, having a trough in the interior thereof, the bottom of said trough formed of the refractory material of the bridge wall, and means for circulating cooling water in said trough in contact with the refractory material.

3. A bridge wall for glass tanks, having a trough in the interior thereof, the bottom of the trough forming the roof of the bridge wall throat, the bottom of the trough formed of the refractory material of the bridge wall, and means for circulating cooling water in said trough in contact with the refractory material.

4. A glass tank, a bridge wall therein, said bridge wall having a throat providing communication between the melting end and the refining end of the tank, said bridge wall having a trough in the interior thereof, the refractory blocks forming the roof of said throat also forming a part of the trough bottom, and means for circulating cooling water in said trough in contact with the refractory blocks.

5. A bridge wall for glass tanks, having a trough in the interior thereof, the side walls and bottom of said trough formed of the refractory material of the bridge wall, and means for maintaining cooling water in said trough at a predetermined height.

6. A bridge wall for glass tanks, having a trough in the interior thereof, means for circulating cooling water in said trough, the bottom of said trough formed of the refractory material of the bridge wall, and the bottom of said trough forming the roof of the bridge wall throat, whereby the water will come into direct contact with the glass when the said roof is sufficiently worn.

7. A bridge wall for glass tanks, having a trough in the interior thereof, the bottom and side walls of said trough formed of the refractory material of the bridge wall, and end walls for said trough, and means permitting the overflow of water at the ends of the trough.

8. A bridge wall for glass tanks, having a trough in the interior thereof, the bottom and side walls of said trough formed of the refractory material of the bridge wall, means for supplying cooling water to said trough, end walls for said trough, and means permitting the overflow of water at the ends of the trough.

9. A bridge wall for glass tanks, having a trough in the interior thereof, the bottom and side walls of said trough formed of the refractory material of the bridge wall, means for supplying water to said trough, and end walls for said trough, the top of said end walls being spaced below the bridge wall roof.

10. A bridge wall for glass tanks, having a trough in the interior thereof, means for circulating water in said trough, and a reinforcing member extending throughout the length of the trough directly over the floor thereof.

11. A bridge wall for glass tanks, having a trough in the interior thereof, means for circulating water in said trough, a reinforcing member extending throughout the length of the trough directly over the floor thereof, and means for anchoring the ends of said member.

12. A bridge wall for glass tanks, having a trough in the interior thereof, the bottom of said trough formed of the refractory material of the bridge wall, the bottom of said trough forming the roof of the bridge wall throat; and means in said trough for preventing the floor of said trough from rising.

13. A bridge wall for glass tanks, having a trough in the interior thereof, means for circulating water in said trough, and a reinforcing member extending throughout the length of the trough directly over the floor thereof, said reinforcing member being hollow.

14. A bridge wall for glass tanks, having a trough in the interior thereof, the bottom and side walls of said trough formed of the refractory material of the bridge wall, the bottom of said trough forming the roof of the bridge wall throat, end walls for said trough, means for circulating water in the trough at a predetermined height, a hollow reinforcing member extending throughout the length of the trough directly over the floor thereof, and the ends of said hollow reinforcing member being anchored in the said end walls.

ALFRED W. DODGE.